United States Patent
Lejeune et al.

(10) Patent No.: US 8,594,089 B2
(45) Date of Patent: Nov. 26, 2013

(54) METHOD OF BROADCASTING DATA BY A MULTICAST SOURCE WITH BROADCASTING OF AN IDENTIFIER OF THE BROADCASTING STRATEGY IN A MULTICAST SIGNALLING CHANNEL

(75) Inventors: Sabine Lejeune, Tregastel (FR); Jean-Baptiste Hennequin, Chatillon (FR); David Dugoujon, Issy les Moulineaux (FR); Thomas Morin, Trebeurden (FR)

(73) Assignee: France Telecom, Paris (FR)

( * ) Notice: Subject to any disclaimer, the term of this patent is extended or adjusted under 35 U.S.C. 154(b) by 230 days.

(21) Appl. No.: 13/121,946

(22) PCT Filed: Sep. 22, 2009

(86) PCT No.: PCT/FR2009/051776
§ 371 (c)(1),
(2), (4) Date: Mar. 30, 2011

(87) PCT Pub. No.: WO2010/037945
PCT Pub. Date: Apr. 8, 2010

(65) Prior Publication Data
US 2011/0176547 A1 Jul. 21, 2011

(30) Foreign Application Priority Data
Sep. 30, 2008 (FR) .................................. 08 56562

(51) Int. Cl.
*H04L 12/28* (2006.01)
(52) U.S. Cl.
USPC .......................................... 370/390; 370/401

(58) Field of Classification Search
USPC .......................... 370/252, 254, 255, 390, 401
See application file for complete search history.

(56) References Cited

U.S. PATENT DOCUMENTS

| | | | |
|---|---|---|---|
| 7,325,073 B2 * | 1/2008 | Shao et al. | 709/238 |
| 7,697,450 B2 * | 4/2010 | D'Amico et al. | 370/252 |
| 7,865,137 B2 * | 1/2011 | Goldberg et al. | 455/11.1 |
| 7,894,377 B2 * | 2/2011 | Lillie et al. | 370/312 |
| 2006/0159117 A1 * | 7/2006 | Furlong et al. | 370/432 |
| 2006/0212907 A1 * | 9/2006 | Akiyama et al. | 725/63 |
| 2007/0223620 A1 * | 9/2007 | Kalhan et al. | 375/295 |
| 2008/0013503 A1 * | 1/2008 | Lee | 370/338 |

FOREIGN PATENT DOCUMENTS

| | | |
|---|---|---|
| EP | 1 434 385 | 6/2004 |
| EP | 1 615 403 | 1/2006 |
| WO | WO 2005/117345 | 12/2005 |
| WO | WO 2007/085763 | 8/2007 |
| WO | WO 2007/113447 | 10/2007 |

* cited by examiner

*Primary Examiner* — Hong Cho
(74) *Attorney, Agent, or Firm* — Knobbe Martens Olson & Bear LLP

(57) ABSTRACT

A method of broadcasting data from a multicast source (S) to a plurality of receivers (CL) in a telecommunications network (1) in accordance with a broadcasting strategy, including: a step (E40) of receiving parameters (STAT, AG, CS); a step (E50) of adjusting said strategy as a function of said parameters; and in the event of modification of said strategy, a step (E70) of broadcasting in a multicast signaling channel, an identifier of this new broadcasting strategy.

17 Claims, 2 Drawing Sheets

METHOD OF BROADCASTING DATA BY A MULTICAST SOURCE WITH BROADCASTING OF AN IDENTIFIER OF THE BROADCASTING STRATEGY IN A MULTICAST SIGNALLING CHANNEL

RELATED APPLICATIONS

This is a U.S. National Phase Application under 35 USC §371 of International Application PCT/FR2009/051776, filed on Sep. 22, 2009.

This application claims the priority of French application Ser. No. 08/56562 filed on Sep. 30, 2008, the content of which is hereby incorporated by reference.

BACKGROUND OF THE INVENTION

The field of the present invention is that of telecommunications networks known as "multibroadcast" networks in which a source is able to broadcast data to a plurality of destinations.

In such networks, routers construct a replication tree between the source and the destinations with the result that a data packet passes only once over each link of the network and is replicated by the routers to reach each of the destinations.

This kind of broadcasting technique is known as a "multicast" technique.

Using such a replication tree allows massive broadcasting of information with maximum optimization of the network resources.

In contrast, multicast broadcast networks are known to be inherently unreliable because the data is transported under the UDP protocol, i.e. in non-connected mode.

The document "P2P Multicast Library" available at http://pml.sourceforge.net/Technology/ proposes a method of making a multicast network reliable in which destinations of a broadcast stream are able to recover fragments of the stream that they have not received from peers of a peer-to-peer network.

In that method, a source of the peer-to-peer network sends the various destinations a message including the characteristics of a strategy for broadcasting of the data by that source.

That method has a major drawback in that it is necessary, as is usual in peer-to-peer networks, for the source to know the destinations to which it must send these strategy characteristics.

Furthermore, a method of that kind requires that the sending of the strategy characteristics be secure, for example through the use of an error correction code mechanism or a specific protocol by means of which the destinations may request resending of the strategy characteristics, either of which solutions is liable to cause great congestion in the network if the number of destinations or the frequency of changes of strategy by the source increases.

SUMMARY OF THE INVENTION

One aspect of the invention is directed to a method of broadcasting data from a multicast source to a plurality of receivers in a telecommunications network in accordance with a broadcasting strategy.

This method includes:
a step of receiving parameters;
a step of adjusting the broadcasting strategy as a function of said parameters; and in the event of modification of said strategy, a step of broadcasting in a multicast signaling channel an identifier of a new broadcasting strategy.

Another aspect of the invention is directed to a source of data broadcast to a plurality of receivers in a telecommunications network according to a broadcasting strategy, this source including:
means for receiving parameters;
means for adjusting the broadcasting strategy as a function of said parameters; and
means for broadcasting in a multicast signaling channel an identifier of a new broadcasting strategy.

Generally speaking, the invention provides for adjusting the strategy for broadcasting of data by the sources as a function of parameters fed back to the sources.

In the present document, the strategy for broadcasting of data by a source is defined by the number of streams used by that source and the characteristics of each of those streams.

According to an embodiment of the invention, after each strategy modification, the source broadcasts an identifier of the new strategy on a multicast signaling channel in order to inform the receivers of it.

By means of this feature, it is not necessary for the source to know the destination of the change of strategy information.

Moreover, sending a strategy identifier rather than the characteristics of the strategy itself has the advantage of avoiding the provision of a specific security mechanism making the destinations responsible for recovering the strategy themselves in unicast messages that are inherently secure.

According to an embodiment of the invention, the parameters fed back to the sources may be of different kinds.

For example, it may be a question of statistics on the reception of fragments of the data by one or more receivers, which statistics may relate to the number of fragments received or to the number of fragments not received.

It may also be a question of the bit rates at which one or more receivers expect to receive.

It may further be a question of an aggregate data item (for example an average) comprising bit rates at which a plurality of receivers expect to receive.

In the above three situations, the source itself defines its new strategy on the basis of the received parameters and implements it after broadcasting an identifier of the new strategy in the multicast signaling channel.

According to an embodiment of the invention, the parameters fed back to the source may also be characteristics of the new strategy. In this situation, the source does not define the new strategy itself, but applies that which is imposed on it.

Another aspect of the invention is directed to a method of supervising the broadcasting of data sent by a multicast source to a plurality of receivers in a telecommunications network in accordance with a broadcasting strategy.

This method includes:
a step of sending at least one of said receivers information relating to the source, said information including an identification of a multicast signaling channel associated with the source intended to broadcast an identifier of said strategy;
a step of obtaining from at least one of the receivers statistics on reception by said receiver of fragments of the data broadcast by the source according to said strategy;
a step of obtaining parameters from said statistics, the parameters including:
an aggregate data item including receiving bit rates expected by a plurality of the receivers; or
characteristics of a new strategy for broadcasting said data; and a step of sending the parameters to the source.

Another aspect of the invention is directed to a supervisor of the broadcasting of data sent by a multicast source to a plurality of receivers in a telecommunications network in accordance with a broadcasting strategy, the supervisor including:

means for sending at least one of said receivers information relating to the source, said information including an identification of a multicast signaling channel associated with the source intended to broadcast an identifier of said strategy;

means for obtaining from at least one of said receivers statistics on reception by said receiver of fragments of the data broadcast by the source in accordance with said strategy;

means for obtaining parameters from said statistics, said parameters including at least:

an aggregate data item (AG) including receiving bit rates (EXP_DB) expected by a plurality of said receivers; or characteristics (CS) of a new strategy for broadcasting said data; and means for sending the parameters to the source.

According to an embodiment of the invention, a supervisor is introduced that is responsible for collecting from a plurality of receivers statistics on the reception of fragments of data and for defining, on the basis of those statistics, the parameters to be fed back to a source.

Those parameters include an aggregate data item representing bit rates at which a plurality of receivers expect to receive, the source being responsible for defining its broadcasting strategy on the basis of this aggregate data item or characteristics of the new strategy defined by the supervisor and imposed on the source.

In one particular implementation of the invention, the supervision method includes:

a step of obtaining the maximum number of streams broadcast simultaneously in the network; and a step of sending that number to the source.

This feature advantageously limits the number of multicast streams broadcast simultaneously in the network.

On reception of such information, a broadcast source is able to modify its strategy to limit the number of streams that it sends so as to guarantee that the total number of multicast streams broadcast in the network does not exceed this maximum number.

In one particular implementation of the invention, the supervision method includes:

a step of sending a request to a router of the network for it to monitor the subscription of the receivers connected to that router to the multicast streams broadcast in the network.

Another aspect of the invention is directed to a method of receiving at least one data stream broadcast by at least one multicast source in a telecommunications network in accordance with a broadcasting strategy, the method including:

a step of detecting in a multicast signaling channel broadcast by a source of the data an identifier of a new broadcasting strategy used by the source; and a step of using a new strategy for receiving said data.

Another aspect of the invention is directed to a receiver of at least one data stream broadcast by at least one multicast source in a telecommunications network in accordance with a broadcasting strategy, this receiver including:

means for detecting in a multicast signaling channel broadcast by a source of said data an identifier of a new broadcasting strategy used by the source; and means for implementing a new strategy for receiving the data.

In one particular implementation, this method includes a step of sending statistics on the reception of stream fragments to a broadcast supervisor of the invention.

In one particular embodiment of the invention, the receiver also sends the above-mentioned entity an ideal receiving bit rate required by the receiver.

In one particular embodiment of the invention, the receiver obtains at least one data fragment from a peer of a peer-to-peer network.

In one particular embodiment of the invention, to define the new strategy for receiving said data:

the receiver evaluates at least one rate of loss of said data on said at least one stream; and the receiver unsubscribes from at least one of said streams if said loss rate exceeds a predetermined threshold.

The particular features and advantages of the data source, the supervisor, and the receiver of the invention are similar to those of the data broadcasting method, the supervision method, and the receiving method referred to above.

In one particular implementation, the various steps of the broadcasting, supervision, and receiving methods are determined by instructions of computer programs.

Other aspects of the invention include:

a computer program on an information medium, this program being adapted to be used in a multicast source or more generally in a computer, this program including instructions for executing the steps of a broadcasting method as described above;

a computer program on an information medium, this program being adapted to be used in a multicast supervisor or more generally in a computer, this program including instructions for executing the steps of a supervision method as described above; and a computer program on an information medium, this program being adapted to be used in a receiver or more generally in a computer, this program including instructions for executing the steps of a receiving method as described above.

These programs may use any programming language and take the form of source code, object code or a code intermediate between source code and object code, such as a partially-compiled form, or any other desirable form.

Another aspect of the invention is directed to a storage medium readable by a computer and including instructions of a computer program for executing the steps of the broadcasting method referred to above.

Another aspect of the invention is directed to a storage medium readable by a computer and including instructions of a computer program for executing the steps of the supervision method referred to above.

Another aspect of the invention is directed to a storage medium readable by a computer and including instructions of a computer program for executing the steps of the receiving method referred to above.

Each of the above information media may be any entity or device capable of storing the program. For example, the medium may include storage means, such as a read-only memory (ROM), for example a compact disk (CD) ROM or a micro-electronic circuit ROM, or magnetic storage means, for example a floppy disk or a hard disk.

Moreover, each of these information media may be a transmissible medium such as an electrical or optical signal, which may be routed via an electrical or optical cable, by radio or by other means. The program of the invention may in particular be downloaded over an Internet-type network.

Alternatively, each of these information media may be an integrated circuit in which the program is incorporated, the circuit being adapted to execute the method in question or to be used in its execution.

BRIEF DESCRIPTION OF THE DRAWINGS

Other features and advantages of the present invention emerge from the description given below with reference to the appended drawings, which show one non-limiting embodiment of the invention. In the figures.

DETAILED DESCRIPTION OF ONE EMBODIMENT

Figure 1:
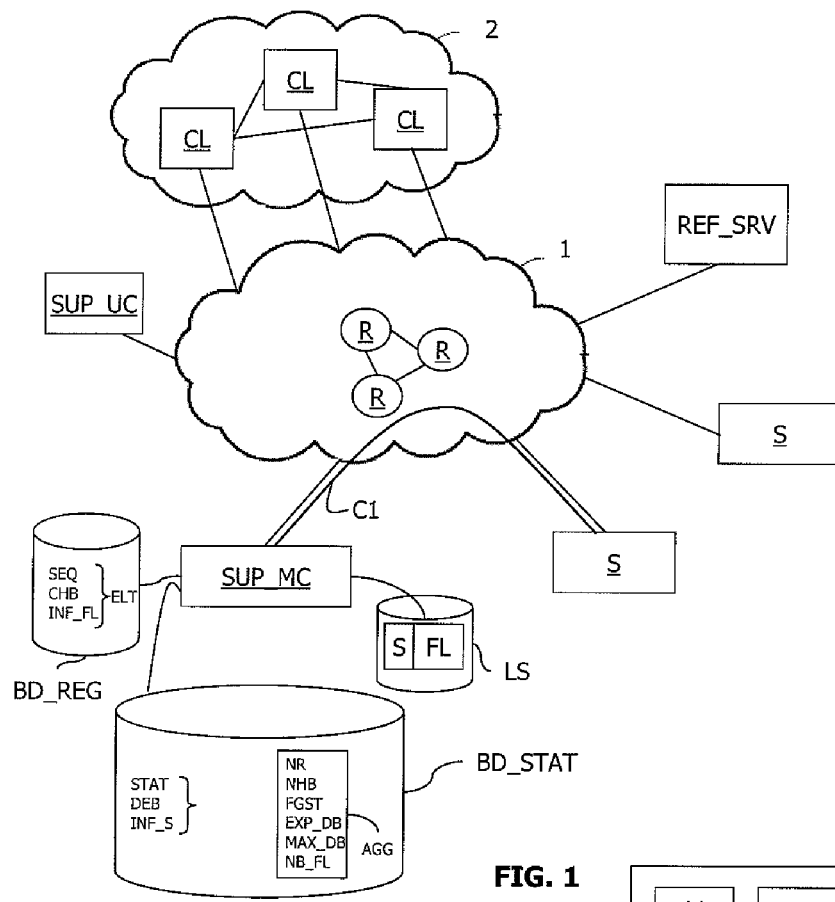
FIG. 1 represents a supervisor and a plurality of sources and receivers.

FIG. 1 illustrates use of the invention to multibroadcast a data content (CONT) from multicast sources S to customer receivers CL in a telecommunications network 1.

The content CONT is generally stored in a file. If a multicast source S or a customer receiver CL has a limit on the size of files that it can manipulate, this file may be divided into a plurality of blocks in order to be able to broadcast it. Otherwise, the content CONT consists of only one block.

In the embodiment described here, a customer receiver CL is required to be able to verify the integrity of received data and each block is divided into one or more fragments, the size of a fragment being defined as a function of the mechanism used to verify its integrity.

At the most atomic level, each fragment is divided into segments. A segment may be encapsulated in a UDP packet to be broadcast in the network 1 by a multicast source S.

According to the invention, broadcasting a data content CONT may involve one or more multicast sources S, each source using one or more multicast streams.

The number of streams used by a multicast source S and the characteristics of each of those streams define the multibroadcasting strategy of the source S. Each strategy has a sequence number SEQ that uniquely identifies it.

In this example, a multicast supervisor SUP_MC informs the customer receivers CL of the multicast sources S and the streams broadcast by those sources. To this end, in the embodiment described here, the multicast supervisor SUP_MC includes a list LS of the multicast sources S and the streams FL broadcast by those sources.

Figure 2:
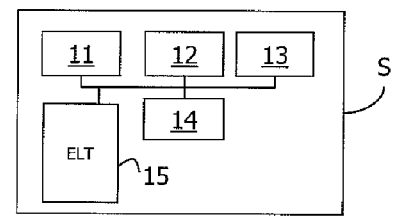
FIG. 2 represents the hardware architecture of a source.

In the embodiment described here, a multicast source S has the hardware architecture of a conventional computer, as represented in FIG. 2.

This kind of multicast source S includes a processor 11, a random-access memory (RAM) 12, and a read-only memory (ROM) 13. This read-only memory 13 constitutes a storage medium of the invention, readable by the multicast source S, in which is stored a computer program of the invention, that program including instructions for executing the steps of a broadcasting method of the invention, the principal steps E10 to E70 of that method being represented in FIG. 5.

The multicast source S includes means for registering with the multicast server SUP_MC.

According to the invention, the multicast source S may vary its broadcasting strategy while broadcasting a data content D.

In the embodiment described here, the multicast source S includes a rewritable non-volatile flash memory 15 in which it stores the elements ELT defining its current multibroadcasting strategy.

The multicast source S also includes means 14 for communicating via the network 1, enabling it in particular to receive data sent by the multicast supervisor SUP_MC and to broadcast over the network:

a heartbeat signaling stream multicast by the source S and to which the customer receivers CL may subscribe; and at least one content stream that carries elements enabling the customer receivers CL to determine the position of the data received in the data content CONT (fragment number, segment number within the fragment).

According to the invention, when a multicast source S changes strategy, it modifies the sequence number SEQ sent in the heartbeat multicast signaling channel to advise the customer receivers CL of the change.

According to the invention, a multicast source S informs the multicast supervisor SUP_MC of any change of strategy by sending it the updated elements ELT, these including the adjusted characteristics INF_FL of each of the streams sent by that source S and the characteristics CHB of its heartbeat signaling stream.

Figure 3:
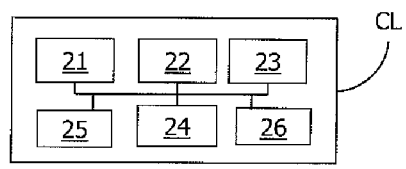
FIG. 3 represents the hardware architecture of a receiver.

In the embodiment described here, the customer receivers CL also have the hardware architecture of a conventional computer, as represented in FIG. 3.

This kind of customer receiver CL includes a processor 21, a random-access memory (RAM) 22, and a read-only memory (ROM) 23. This read-only memory 23 constitutes a storage medium of the invention, readable by the customer receiver CL, on which is stored a computer program of the invention including instructions for executing the steps of a receiving method of the invention, the principal steps G10 to G80 of that method being represented in FIG. 5.

The customer receiver CL also includes means 24 for sending data to the multicast supervisor SUP_MC or for consulting it obtain a list of the multicast sources S and the characteristics ELT of the streams FL broadcast by those sources. In the embodiment described here, the communications means 24 use the HTTP protocol and the requests to the multicast supervisor SUP_MC are HTTP GET messages.

The customer receiver CL includes means 25 for implementing the IGMP multicast access protocol, these means enabling this customer to subscribe to the traffic sent by a multicast source S so as to receive the heartbeat signaling multicast stream and the content stream or streams broadcast by that source S. These means are known to the person skilled in the art and are not described in detail here.

According to the invention, the customer receiver CL is able to detect a change of sequence number SEQ in the heartbeat multicast signaling stream and to interpret such a change as representing a change of broadcasting strategy by the multicast source S sending that stream. Following such detection, the customer receiver CL of the invention is able to consult the multicast supervisor MC to obtain the elements ELT of the new strategy.

In the embodiment described here at least some customer receivers CL are peers of a peer-to-peer network 2.

These receivers CL use communications means 26 to communicate with each other over the peer-to-peer network to exchange fragments of the content CONT that they have received either directly from other peers (in unicast mode) or as multibroadcast by one or more multicast sources S. They are also able to verify the integrity of these fragments.

To this end they may for example use a reliability enhancement method as described in the document WO 2007/085763.

In the embodiment described here, the peer-to-peer network 2 is a file distribution network of the file swarming type using the BitTorrent protocol or a similar protocol and in which each customer receiver CL that is a peer of this network can send the other peers file fragments even before receiving the file completely.

In this embodiment, the system of the invention includes a unicast supervisor SUP_CC with which a customer receiver CL may register to obtain a list of other peers of the peer-to-peer network 2 with which it may communicate to exchange file fragments corresponding to a given content.

The customer receivers CL of the invention include means for regularly sending the multicast supervisor SUP_MC statistics STAT on the reception of the content and possibly an ideal receiving bit rate EXP_DB. In the embodiment described here, these statistics STAT include a list of fragments received by this customer receiver CL and a list of fragments not received by this customer receiver CL.

These statistics STAT relate at least to the fragments broadcast by the multicast sources S. If a customer receiver CL is also a peer of the peer-to-peer network 2, these statistics STAT also relate to the fragments received in unicast mode from other peers.

According to the invention, the customer receiver CL includes means 21, 22, 23 for defining and modifying its receiving strategy. These means are further described below with reference to the step G80 of the receiving method used by this receiver.

Figure 4:
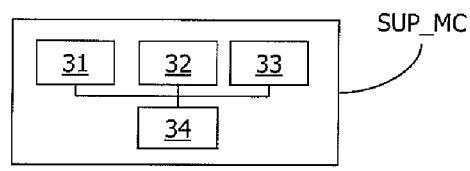
FIG. 4 represents the hardware architecture of a supervisor.

In the embodiment described here, the multicast supervisor SUP_MC also has the hardware architecture of a conventional computer, as represented in FIG. 4.

It includes a processor 31, a random-access memory (RAM) 32, and a read-only memory (ROM) 33. This read-only memory 33 constitutes a storage medium of the invention, readable by the multicast supervisor SUP_MC, on which is stored a computer program of the invention including instructions for executing the steps of a supervision method of the invention, the principal steps F10 to F80 of that method being represented in FIG. 5.

The multicast supervisor SUP_MC includes means for registering a multicast source having one or more streams to transmit. To this end, in the embodiment described here, it manages a database BD_REG that includes for each registered multicast source S the parameters of the heartbeat signaling streams and the characteristics of the data streams sent by that source.

In one particular embodiment of the invention, the elements ELT sent by a multicast source S to the multicast supervisor SUP_MC for registration purposes are:
  the sequence number SEQ of the sending strategy;
  information CHB on the heartbeat channel of the source S, for example the heartbeat multicast IP address, the destination UDP port, and the period; and
  for each stream sent by the source S, information INF_FL on that stream including for example the multicast destination IP address of that stream, the destination UDP port, the bit rate, the fragment numbers at the start and at the end of the sequence, and a time reference enabling a customer receiver CL to calculate approximately when an item of data will be sent.

In the embodiment described here, the multicast supervisor SUP_MC stores these new elements ELT in the database BD_REG.

In the embodiment described here, the multicast supervisor SUP_MC includes means 24 for communicating over the network 1, enabling it in particular to communicate with a multicast source S using the TCP protocol.

In the embodiment described here, the multicast supervisor SUP_MC uses these means 24 to set up a communications channel C1 with each multicast source S registered with it.

According to the invention, the multicast supervisor SUP_MC includes means for receiving from at least one customer receiver CL statistics STAT on the fragments received or not received by that customer receiver, possibly the ideal multicast receiving bit rate EXP_DB for that customer receiver CL, and information INF_S on the multicast sources S from which this customer receiver CL receives the heartbeat signaling streams.

In the embodiment described here, the multicast supervisor SUP_MC stores this information in a database BD_STAT.

In the embodiment described here, the communications means 34 of the supervisor SUP_MC enable it to monitor the routers R of the network 1 to limit the maximum number NB_FL of multicast streams broadcast simultaneously in the network 1.

According to the invention, the multicast supervisor SUP_MC includes means 31, 32, 33 for aggregating in an aggregate data item AG the ideal bit rate EXP_DB, possibly the statistics STAT, and the information INF_S on the multicast sources.

In the embodiment described here, the aggregate data item AG created by the multicast supervisor SUP_MC for a multicast source S and a particular content includes:
  the number NR of customer receivers CL receiving that content;
  the number NHB of customer receivers CL receiving the heartbeat stream from that source;
  reception statistics FGST including for example, for each fragment FG, the number of customer receivers CL that have received that fragment and the heartbeat from the source;
  one or more ideal bit rates EXP_DB expected by the customer receivers CL;
  the maximum bit rate MAX_DB of the streams advertised by the customer receivers CL; and possibly
  the number NB_FL of streams that the multibroadcasting network can support.

In the embodiment described here, the aggregate data item AG is stored in the database BD_STAT.

According to the invention, the multicast supervisor SUP_MC includes means for making this aggregate data item AG available to the multicast source S concerned. In the embodiment described here, the multicast supervisor SUP_MC sends the aggregate data item AG to a multicast source S in the communications channel C1 set up between the multicast supervisor SUP_MC and the source S by its communications means 34.

In another embodiment, the multicast supervisor SUP_MC sends a multicast source S the characteristics CS of the strategy that it is to deploy.

According to the invention, a multicast source S includes means for adjusting its sending strategy as a function of aggregate data items AG received from the multicast supervisor SUP_MC and possibly strategy characteristics CS indicated thereby.

Figure 5:
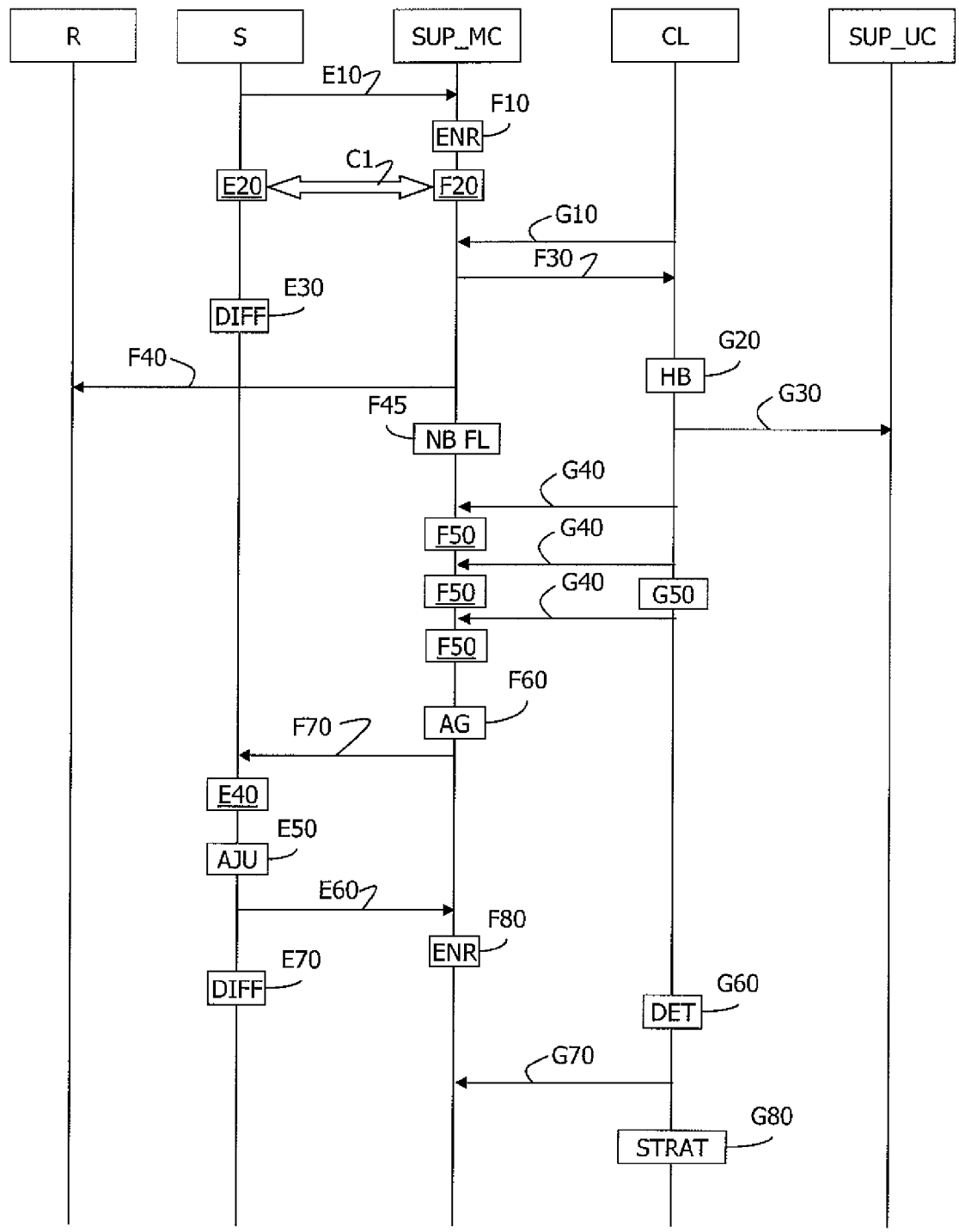
FIG. 5 represents the principal steps of the broadcasting, supervision, and receiving methods.

FIG. 5 represents diagrammatically a data multibroadcasting session using the invention.

During a step E10, a multicast source S registers with the multicast supervisor SUP_MC, sending it the elements ELT including the parameters CHB of the heartbeat flux and the characteristics SEQ, INF_FL of each stream that it sends. This information is stored by the multicast supervisor SUP_MC in the database BD_REG during a step F10.

The multicast supervisor SUP_MC and the multicast source S then set up a communications channel C1 on which they are able to communicate using the TCP protocol, respectively during a step F20 and a step E20. In the embodiment described here, this channel C1 is set up at the initiative of the supervisor SUP_MC.

It is assumed that at least one customer receiver CL consults the multicast supervisor SUP_MC during a step G10 to obtain the list of the multicast sources S broadcasting a content CONT of interest to it. In the embodiment described here, this consultation is effected by means of the HTTP message GET. The customer receiver preferably indicates in this request the maximum receiving bit rate accepted by this customer.

On reception of such a request, the multicast supervisor SUP_MC communicates to the customer receiver CL during a step F30 the multicast sources S broadcasting with a bit rate acceptable to the customer receiver CL and, for each of those sources, the information CHB on the heartbeat signaling channel of the source and the information INF_FL on each stream broadcast by that source.

It is assumed that the multicast source S begins to broadcast during a step E30:
  its heartbeat stream; and
  one or more content streams, in accordance with its strategy as defined by the elements ELT that it communicated to the multicast supervisor SUP_MC in the step E10 at registration time.

To receive data broadcast by a multicast source S, a customer receiver CL subscribes during a step G20 to the heartbeat signaling channel and to one or more streams broadcast by that source S, the multicast supervisor SUP_MC having communicated the information on these various streams to it during the step F30.

It is assumed in this example that a customer receiver CL is a peer of the peer-to-peer network 2 and is also seeking to be able to exchange fragments of the content CONT with other peers of this network.

To this end, the peer registers with the unicast supervisor SUP_UC during a step G30 and obtains from that server a list of peers of the peer-to-peer network 2 seeking to exchange fragments of this content.

In the embodiment described here, during a step F40 the supervisor SUP_MC sends a request RQ to a router R of the network for that router to monitor the subscription of the receivers that are connected to it to the multicast streams broadcast in the network. To be more precise, this subscription monitoring consists in verifying that a receiver does not access streams other than those to which it subscribed during the step G20.

Then, during a step F45, supervisor SUP_MC obtains the maximum number NB_FL of streams that can be broadcast simultaneously in the network.

According to the invention, a customer receiver CL regularly sends the multicast supervisor SUP_MC during a step G40 the statistics STAT on the fragments received or not received by that customer receiver CL, the ideal multicast receiving bit rate EXP_DB for that customer receiver CL, and information INF_S on the multicast sources S from which this customer receiver CL receives the heartbeat streams. The multicast supervisor SUP_MC receives and stores these statistics in the database BD_STAT during a step F50.

During a step F60, the multicast supervisor SUP_MC aggregates in an aggregate data item AG the statistics STAT, the ideal bit rate EXP_DB expected by each receiver, the maximum number of streams NB_FL that the network 1 is able to support, and the information on the multicast sources. The multicast supervisor SUP_MC stores this aggregate data item AG in the database BD_STAT during this same step F60.

Then, during a step F70, the multicast supervisor SUP_MC sends the aggregate data item AG via the channel C1 set up with the source S concerned to that source so that the latter source is able to adjust its strategy. Alternatively, it imposes a strategy on it by communicating to it the characteristics CS of the latter strategy. This aggregate data item AG or the strategy characteristics CS are received by the source during a step E40.

The multicast source S adjusts its strategy during a step E50 as a function of the aggregate data item or the characteristics of the strategy CS defined by the supervisor.

As soon as it modifies its sending strategy, the multicast source S sends the multicast supervisor SUP_MC during a step E60 the elements ELT of the updated new strategy, including the adjusted characteristics INF_FL of each of the streams sent by the source S and the characteristics CHB of its heartbeat stream.

These updated elements ELT are stored by the multicast supervisor SUP_MC during a step F80.

Simultaneously, during a step E70, the multicast source S modifies the sequence number SEQ sent in the heartbeat signaling stream that it is broadcasting to inform the customer receivers CL of its change in broadcasting strategy.

The customer receiver CL detects the new sequence number during a step G60 of its receiving method.

It may then decide during a step G80 to modify its receiving strategy by subscribing to new multicast broadcasting channels (discovered by consulting the multicast supervisor SUP_MC during a step G70), by unsubscribing from some multicast channels or by looking for some missing fragments on the peer-to-peer network 2.

To define its receiving strategy, a customer receiver CL preferably detects the multibroadcast streams that it is able to receive, subscribes to those streams, detects segments received incorrectly in those streams, waits a particular time in the hope of receiving the missing segments following the change of strategy of one or more multicast sources, and as a last resort obtains the missing segments from the peers of the peer-to-peer network 2.

In one particular embodiment of the invention, if a customer receiver detects a high number of lost packets, it unsubscribes from one or more multicast streams. This characteristic has the advantage of making it possible to control congestion in the multicast network 1 by preventing a customer receiver CL subscribing to a number of streams that is too high given the capacities of the network 1.

To this end, in one particular embodiment of the invention a customer receiver CL determines the total segment loss rate and the loss rate per stream.

If the loss rate relates to only one or some streams, it is probable that the network is a congestion between the multicast source S of that stream and the customer receiver CL. In this situation the customer receiver CL could unsubscribe from this stream temporarily, hoping that the congestion disappears.

However, if the loss rate is distributed across all the streams, the customer receiver CL reduces the number of streams to which it subscribes and seeks to obtain the missing fragments from the peers of the network 2.

As explained above, the invention has the advantage that it makes it possible to modify the strategies for broadcasting of a content by a multicast source.

In a manner that is not limiting on the invention, the invention may use the following broadcasting strategies:

single-stream strategy: in this strategy the source broadcasts all the content in loop mode in a single stream; and simple phase-shifted multistream strategy: this strategy is applied if a source has all of the content to be broadcast when broadcasting starts; the source constructs N streams (N being the maximum number of streams determined by configuring the source), each broadcasting the whole of the content with a time-shift at the ideal bit rate indicated by the multicast supervisor SUP_MC.

The invention claimed is:

1. A method of broadcasting data from a multicast source to a plurality of receivers in a telecommunications network, wherein said source performs a process comprising:

broadcasting data and an identifier, the data being broadcast in accordance with a first broadcasting strategy identified by the identifier;

receiving, from a supervisor, parameters relating to the broadcasting of data by the source;

adjusting said first broadcasting strategy as a function of said parameters to obtain a new broadcasting strategy; and broadcasting in a multicast signaling channel, an identifier of the new broadcasting strategy, wherein each of the first strategy and the new strategy take into account factors comprising the number of streams used by a source and the characteristics of each of those streams.

2. The broadcasting method according to claim 1, wherein said parameters include at least one of the elements belonging to the group comprising:

statistics on reception of fragments of said data by at least one of said receivers;

a receiving bit rate expected by at least one of said receivers;

a maximum number of streams that said network is able to support;

an aggregate data item including receiving bit rates expected by a plurality of said receivers; and characteristics of said new broadcasting strategy defined by the supervisor.

3. A computer program including instructions for executing the data broadcasting method according to claim 1 when said program is executed by a computer.

4. A method of supervising the broadcasting of data sent by a multicast source to a plurality of receivers in a telecommunications network in accordance with a broadcasting strategy, wherein a supervisor performs a process comprising:

sending, to at least one of said receivers, information relating to the source, said information including an identification of a multicast signaling channel associated with the source intended to broadcast an identifier of said strategy;

obtaining, from the receiver, statistics concerning the reception, by said receiver, of fragments of said data broadcast by the source in accordance with said strategy;

obtaining, from the obtained statistics, parameters including:

an aggregate data item including receiving bit rates expected by a plurality of said receivers; or characteristics of a new strategy, defined by the supervisor, for broadcasting said data; and sending said parameters to said source, wherein each of the first strategy and the new strategy take into account factors comprising the number of streams used by a source and the characteristics of each of those streams.

5. The supervision method according to claim 4, comprising:

obtaining the maximum number of streams broadcast simultaneously in said network; and sending that number to said source.

6. The supervision method according to claim 4, comprising:

sending a request to a router of said network for it to monitor the subscription of the receivers broadcast connected to that router to the multicast streams broadcast in said network.

7. A computer program including instructions for executing the data receiving method according to claim 6 when said program is executed by a computer.

8. A computer program including instructions for executing the supervision method according to claim 4 when said program is executed by a computer.

9. A method of receiving at least one data stream broadcast by at least one multicast source in a first telecommunications network in accordance with a broadcasting strategy, wherein at least one receiver performs a process comprising:

receiving, by means of a multicast signaling channel, data and an identifier, the data being broadcast by the at least one source in accordance with a first broadcasting strategy identified by the identifier;

sending, to a broadcast supervisor of said network, statistics concerning the reception, by said receiver, of fragments of said data broadcast by the source in accordance with said strategy;

detecting, in the multicast signaling channel broadcast by the source of said data, an identifier of a new broadcasting strategy used by said source;

obtaining the new broadcasting strategy; and using the new strategy for receiving said data, wherein each of the first strategy and the new strategy take into account factors comprising the number of streams used by a source and the characteristics of each of those streams.

10. The receiving method according to claim 9, comprising obtaining at least one fragment of said data from a peer of a peer-to-peer network.

11. The receiving method according to claim 9, wherein to define the new strategy for receiving said data:

at least one rate of loss of said data on said at least one stream is evaluated; and at least one of said streams is unsubscribed from if said loss rate exceeds a predetermined threshold.

12. A source of data broadcast to a plurality of receivers in a telecommunications network, the source comprising:

means for broadcasting data and an identifier, the data being broadcast in accordance with a first broadcasting strategy identified by the identifier;

means for receiving, from a supervisor, parameters relating to the data broadcasting;

means for adjusting said first broadcasting strategy as a function of said parameters to obtain a new broadcasting strategy; and means for broadcasting, in a multicast signaling channel, an identifier of the new broadcasting strategy, wherein each of the first strategy and the new strategy take into account factors comprising the number of streams used by a source and the characteristics of each of those streams.

13. A supervisor of the broadcasting of data sent by a multicast source to a plurality of receivers in a telecommunications network in accordance with a broadcasting strategy, said supervisor comprising:
    means for sending, to at least one of said receivers, information relating to the source, said information including an identification of a multicast signaling channel associated with the source intended to broadcast an identifier of said strategy;
    means for obtaining, from at least one of said receivers, statistics concerning the reception, by said receiver, of fragments of said data broadcast by the source in accordance with said strategy;
    means for obtaining, from the obtained statistics, parameters including:
        an aggregate data item including receiving bit rates expected by a plurality of said receivers; or
        characteristics of a new strategy, defined by the supervisor, for broadcasting said data; and
    means for sending said parameters to said source, wherein each of the first strategy and the new strategy take into account factors comprising the number of streams used by a source and the characteristics of each of those streams.

14. A receiver of at least one data stream broadcast by at least one multicast source in a first telecommunications network in accordance with a broadcasting strategy, said receiver comprising:
    means for receiving, by means of a multicast signaling channel, data and an identifier, the data being broadcast by the at least one source in accordance with a first broadcasting strategy identified by the identifier;
    means for sending, to a broadcast supervisor of said network, statistics concerning the reception, by the receiver, of fragments of data of said stream;
    means for detecting, in the multicast signaling channel broadcast by the source of said data, an identifier of a new broadcasting strategy used by said source;
    means for obtaining the new broadcasting strategy; and
    means for implementing the new strategy for receiving said data, wherein each of the first strategy and the new strategy take into account factors comprising the number of streams used by a source and the characteristics of each of those streams.

15. A source of data broadcast to a plurality of receivers in a telecommunications network, said source comprising:
    a component configured to broadcast data and an identifier, the data being broadcast in accordance with a first broadcasting strategy identified by the identifier;
    a component configured to receive, from a supervisor, parameters relating to the data broadcasting;
    a component configured to adjust said first broadcasting strategy as a function of said parameters to obtain a new broadcasting strategy; and
    a component configured to broadcast, in a multicast signaling channel, an identifier of the new broadcasting strategy, wherein each of the first strategy and the new strategy take into account factors comprising the number of streams used by a source and the characteristics of each of those streams.

16. A supervisor of the broadcasting of data sent by a multicast source to a plurality of receivers in a telecommunications network in accordance with a broadcasting strategy, said supervisor comprising:
    a component configured to send, to at least one of said receivers, information relating to the source, said information including an identification of a multicast signaling channel associated with the source intended to broadcast an identifier of said strategy;
    a component configured to obtaining, from at least one of said receivers, statistics concerning the reception, by said receiver, of fragments of said data broadcast by the source in accordance with said strategy;
    a component configured to obtain, from the obtained statistics, parameters including:
        an aggregate data item including receiving bit rates expected by a plurality of said receivers; or
        characteristics of a new strategy, defined by the supervisor, for broadcasting said data; and
    a component configured to send said parameters to said source wherein each of the first strategy and the new strategy take into account factors comprising the number of streams used by a source and the characteristics of each of those streams.

17. A receiver of at least one data stream broadcast by at least one multicast source in a first telecommunications network in accordance with a broadcasting strategy, said receiver comprising:
    a component configured to receive, by means of a multicast signaling channel, data and an identifier, the data being broadcast by the at least one source in accordance with a first broadcasting strategy identified by the identifier,
    a component configured to send, to a broadcast supervisor of said network, statistics concerning the reception, by said receiver, of fragments of said data broadcast by the source in accordance with said strategy;
    a component configured to detect, in the multicast signaling channel broadcast by a source of said data, an identifier of a new broadcasting strategy used by said source;
    a component configured to obtain the new broadcasting strategy, and
    a component configured to implement the new strategy for receiving said data, wherein each of the first strategy and the new strategy take into account factors comprising the number of streams used by a source and the characteristics of each of those streams.

* * * * *